(12) United States Patent
Faisy

(10) Patent No.: US 7,426,331 B2
(45) Date of Patent: Sep. 16, 2008

(54) METHOD AND SYSTEM FOR PROGRAMMING RECORDINGS THROUGH SMS-CB TRANSMISSION AND PROGRAMMING TERMINAL EQUIPMENT

(75) Inventor: Christian Faisy, St Denis de la Reunion (FR)

(73) Assignee: Societe Francaise du Radiotelephone, Paris (FR)

( * ) Notice: Subject to any disclaimer, the term of this patent is extended or adjusted under 35 U.S.C. 154(b) by 982 days.

(21) Appl. No.: 10/929,328

(22) Filed: Aug. 30, 2004

(65) Prior Publication Data

US 2005/0084240 A1    Apr. 21, 2005

(30) Foreign Application Priority Data

Sep. 1, 2003 (FR) .................................. 03 10362

(51) Int. Cl.
*H04N 5/91* (2006.01)
(52) U.S. Cl. ............................. 386/83; 386/46; 725/58; 725/61; 725/112
(58) Field of Classification Search .................. 386/46, 386/83, 95; 725/37, 42, 58, 61, 100, 110, 725/112, 131
See application file for complete search history.

(56) References Cited

U.S. PATENT DOCUMENTS

| 6,300,976 | B1 * | 10/2001 | Fukuoka | 348/231.99 |
| 6,862,556 | B2 * | 3/2005 | Feola et al. | 702/187 |
| 2002/0054750 | A1 * | 5/2002 | Ficco et al. | 386/46 |
| 2003/0190149 | A1 * | 10/2003 | Chang et al. | 386/83 |

FOREIGN PATENT DOCUMENTS

FR     2 716 327     2/1994

* cited by examiner

*Primary Examiner*—Thai Tran
*Assistant Examiner*—Mishawn Dunn

(57) ABSTRACT

The method for programming recordings is applied to a recorder device containing a videogram medium and connected to a programming terminal equipment unit located in an area covered by one or more radio cells of a cellular radiotelephony network. The terminal equipment has receiving and reading means capable of receiving text messages transmitted over a broadcast channel of the network and reading concatenation sequences contained in the messages, each containing information data of a programme item from a programme broadcaster. The user selects on an input interface of the recorder device, a type of programme to be recorded which is transformed with a determined format into a recording code, which code is compared with at least one portion of each of the sequences so as to use the recording data and automatically parameterize the recording.

23 Claims, 3 Drawing Sheets

METHOD AND SYSTEM FOR PROGRAMMING RECORDINGS THROUGH SMS-CB TRANSMISSION AND PROGRAMMING TERMINAL EQUIPMENT

BACKGROUND OF THE INVENTION

1. Field of the Invention

The present invention relates to the field of programming recordings. More specifically, the present invention concerns a method and a system for programming recordings through SMS-CB (Short Message Service—Cell Broadcast) transmission as well as to a terminal equipment for programming a recorder of videogram media.

2. Brief Description of Related Developments

The establishment of a programme catalog on teletext pages is known from the prior art. With a cursor, it is possible to select a programme to be recorded, which is provided with a programming code. When subsequently, a real time programming code which is transmitted through the television channel corresponds to programming information which has been stored, the video tape recorder is triggered. This system has the drawback that information concerning television programmes is transmitted through a teletext service connected to a television channel, hence of limited capacity.

It ensures from this that the provided service can only concern a limited number of programme broadcasters. Further, each channel is required to broadcast the service, which generates large redundancy which is particularly detrimental for a teletext resource which is limited.

A programming method marketed under the SHOWVIEW brand is also known from document WO 90/07844 and which uses a compressed code containing information on the channel, the date and the time of the programmes. These codes are published in magazines and are manually introduced into a control device by a user in order to allow selected programmes to be recorded. A drawback of this method is that it is not suited for recording updated programmes. Additionally, the programming cannot be achieved per kind of broadcast but only programme by programme. Actually the user is required to refer to his TV programme magazine before introducing the compressed code.

In Patent FR 2 716 327, a method for programming recordings is described allowing a TV programme schedule radio-broadcasted from a server to be stored in a terminal provided with a radio receiver. The radio channel used is of the RDS-FM (Radio Data System—Frequency Modulation) type, or the like. However, this method does not provide programming per category or kind of broadcasted programme. There again, the user is required to refer to a programme schedule in order to select subsequently what he/she wants to record.

SUMMARY OF THE INVENTION

Accordingly, the object of the present invention is to suppress one or several of the drawbacks of the prior art by defining a method for programming recordings by remote triggering of a recorder device, by using so-called "Cell Broadcast" SMS technology with transmission through a radio cell of at least one cellular radio telephony network.

With this technology, it is notably possible to send in real time one or more SMS text messages to all the cellular telephones located within a determined area covered by one or several radio cells, through dedicated broadcast channels. This is the CBCH (Cell Broadcast Channel) downlink channel, notably used for broadcasting short specific messages (weather, traffic information, etc.) to cellular telephones, which allows bulk sending of messages. A maximum of 93 characters may be contained in the Cell Broadcast message, but up to 15 messages may be concatenated in order to form a macromessage. An object of the invention is to provide a method for transmitting towards a recorder device over the radio CBCH channel, data representative of television programmes and integrated in "SMS-CB" messages.

For this purpose, the invention concerns a method for programming recordings for a recorder device containing a videogram medium and connected to a programming terminal equipment unit located in a determined area covered by one or more radio cells of at least one cellular radiotelephony network, the method being characterized in that it includes the following steps:

- a first programming step performed by a user, comprising the input of at least one type of programme to be recorded by means of an input interface of the recorder device connected to the terminal equipment unit, the type of programme being encoded with a determined format in a recording code by coding means of the programming terminal equipment unit;
- a step for storing the recording code in the storage means of the programming terminal equipment unit;
- a step for receiving, through receiving and reading means of the terminal equipment unit, coded data representative of a programme planning schedule of programme items from a plurality of programme broadcasters and information for identifying said programme items, transmitted over at least one broadcast channel of the cellular radiotelephony network within said determined area, in text messages, each of the programme items being defined by at least one concatenation sequence comprising at least one first portion coded with the recording code format and a second complementary portion;
- a step for detecting at least one desired programme item, consisting of discriminating among the plurality of first coded portions, at least one first portion similar to the recording code;
- a second programming step automatically performed by the terminal equipment unit, using the first discriminated portion and/or its second complementary portion for parameterizing in the recorder device the recording of the detected programme item.

The invention allows to parameterize specifically the recording without the user having to exactly know all the recording parameters such as the time for the beginning and the end of a programme item.

According to another feature, the input of the type of programme by the user forms a sequence notably concatenating the following data:

- data representative of a programme item category comprising a string of at least three characters,
- data representative of a programme item kind comprising a string of at least two characters,
- data representative of a programme item sub-kind comprising a string of at least two characters.

According to another feature, the sequence formed on input by the user of the type of programme further comprises data representative of a broadcast channel of a programme broadcaster, formed with at least two characters.

According to another feature of the invention, the first coded portion of the data of a programme item comprises data representative of a programme item category, kind, sub-kind and of a broadcast channel of a programme broadcaster, the second complementary portion comprising data representative of a date, of a time for the beginning and the end of the broadcast of the programme item.

According to another feature of the invention, the coded data are transmitted from a server connected to at least one cellular radiotelephony network and broadcasted in text messages of the SMS-CB type over a CBCH broadcast downlink channel of said network.

The invention allows to provide information data required for programming a recording to a plurality of recorder devices located within a determined area for example covered by a radio cell, through a dedicated broadcast channel.

According to another feature of the invention, the detection step comprises the discrimination of the set formed by the first and second portions.

According to another feature of the invention, a step for blocking access to the broadcast channel of the cellular radiotelephony network is performed on the one hand by identifying in the programming terminal equipment unit, an identity module consisting of an SIM or USIM type chip card for second or third generation networks or an equivalent card including in a memory parameterizable data for authorizing access to said broadcast channel, and on the other hand by changing said access authorization data.

According to another feature, the method according to the invention includes a step for encrypting data transmitted over the CBCH broadcast channel and for decrypting these data by the receiving and reading means of the terminal equipment unit.

According to another feature, the first programming step further comprises the input of a recording time interval.

According to another feature, the first programming step comprises a prioritization of at least one characteristic relating to the type of programme to be recorded.

According to another feature, the codes of programmed recordings stored in the programming terminal equipment unit are sent over an SMS channel of the cellular radiotelephony network, to a knowledge database for statistical use.

The object of the invention is also to provide a system for programming recordings, with which the drawbacks of the prior art may be suppressed.

For this purpose, the invention concerns a system for programming recordings for a recorder device containing a videogram medium and connected to a programming terminal equipment unit, characterized in that it includes a server comprising storage means for storing a base of coded data representative of a programming planning schedule of programme items from a plurality of programme broadcasters and of information for identifying said programme items, the server also comprising means for connecting to at least one cellular radiotelephony network in order to broadcast in at least one text message, coded data of said database, over at least one broadcast channel of the network, said terminal equipment unit comprising receiving and reading means for reading the text messages transmitted over said channel broadcasting the coded data of the server, each of the programme items being defined by at least one concatenation sequence coded by a reference transformation system and forming a first portion coded with a determined format and a second complementary portion; and in that the recorder device comprises an input interface connected to the terminal equipment to allow the user to input a type of programme to be recorded, the terminal equipment unit including encoding means for coding the type of programme with said determined format in a recording code and storage means for storing the recording code, the processing means of the terminal equipment unit comprising a discrimination module for detecting at least one desired programme item by comparing at least one first portion of each of the text message concatenation sequences with the recording code and the automatic parameterization means using the first discriminated portion and/or its second complementary portion for parameterizing in the recorder device the recording of the detected programme item.

According to another feature, the cellular radiotelephony network comprises a radio subsystem connected to the server and to at least one CBCH broadcast downlink channel of said network for broadcasting data from said database in at least one text message of the SMS-CB type in a determined area covered by one or more radio cells of the network.

According to another feature of the invention, the database includes coded data of programme item having a first coded portion containing information representative of a category, kind, sub-kind of programme item, broadcast channel of programme broadcaster, and a second complementary portion containing information representative of a date, of a time for the beginning and the end of the broadcast of the programme item.

According to another feature, said determined format comprises a sequence notably concatenating data representative of category, kind and sub-kind of a programme item, as well as data representative of a broadcast channel of a programme broadcaster.

According to another feature, the programming terminal equipment unit includes an identity module consisting of an SIM or a USIM type chip card for second or third generation networks or an equivalent card including in a memory parameterizable data for authorizing access to said broadcast channel of the network.

According to another feature, the receiving and reading means include a transmitting/receiving antenna for sending codes of recordings over an SMS channel of the network, the server comprising means for storing and indexing programme recording codes transmitted by the programming terminal equipment units.

According to another feature, the server comprises encrypting/decrypting means for encrypting data to be transmitted over the network whereas the programming terminal equipment unit comprises means for decrypting these data and encrypting means for sending recording codes to the storage and indexation means of the server.

The object of the invention is also to provide terminal equipment for programming recordings performed by a recorder device, allowing text messages transmitted in a cellular radiotelephony network to be received.

For this purpose, the invention concerns programming terminal equipment unit for programming at least one triggering of a recorder device for recording a programme broadcasted over the broadcast channel of a programme broadcaster, comprising processing means and storage means, characterized in that it includes:

receiving and reading means capable of receiving text messages transmitted over at least one broadcast channel of a cellular radiotelephony network and reading a plurality of concatenation sequences contained in the text messages, each representative of a programme item identification and programming planning schedule of a programme broadcaster;

means for connecting to an input interface of the recorder device allowing the user to select a type of programme to be recorded;

coding means for encoding the type of selected programme with a determined format in a recording code, said storage means storing the recording code;

a discrimination module in the processing means for detecting a programme item to be recorded by identifying, among the plurality of concatenation sequences read by the receiving and reading means, at least one coded portion with said determined format in a concatenation sequence and comparing this coded portion with the recording code;

automatic parameterization means using the discriminated coded portion and/or a complementary portion in the same concatenation sequence in order to parameterize in the recorder device, the beginning and the end of the recording as well as the broadcast channel of the programme item detected by the discrimination module.

According to another feature, the receiving and reading means comprise a transmitting/receiving antenna compatible with a GSM, GRPS, UMTS, etc . . . cellular radiotelephony network or the like, and means for accessing a CBCH broadcast downlink channel of said network to allow at least one text message of the SMS-CB type to be read on the one hand, and means for accessing the SMS channels to allow recording codes to be sent to a knowledge database for statistical use, on the other hand.

According to another feature, the receiving and reading means include an identity module consisting of an SIM or USIM chip card for second or third generation networks or an equivalent card including in a memory parameterizable data for authorizing access to said broadcast channel of the network.

According to another feature, the receiving and reading means comprise means for decrypting concatenation sequences.

According to another feature, the discrimination module comprises means for comparing data representative of the broadcast channel, of a category, and of at least one classification per kind of programme item, respectively, the storage means being configured for storing in a register the concatenation sequence comprising a coded portion with said determined format, the data of which compared by comparison means being identical with those of the recording code, the automatic parameterization means being connected to the storage means in order to use the recording data of the sequence stored in said register.

BRIEF DESCRIPTION OF THE DRAWINGS

The invention, with its characteristics and advantages, will become more apparent upon reading the description made with reference to the appended drawings given as non-limiting examples wherein.

DETAILED DESCRIPTION OF THE PREFERRED EMBODIMENT(S)

The invention will now be described with reference to FIGS. 1 and 2.

Figure 1:
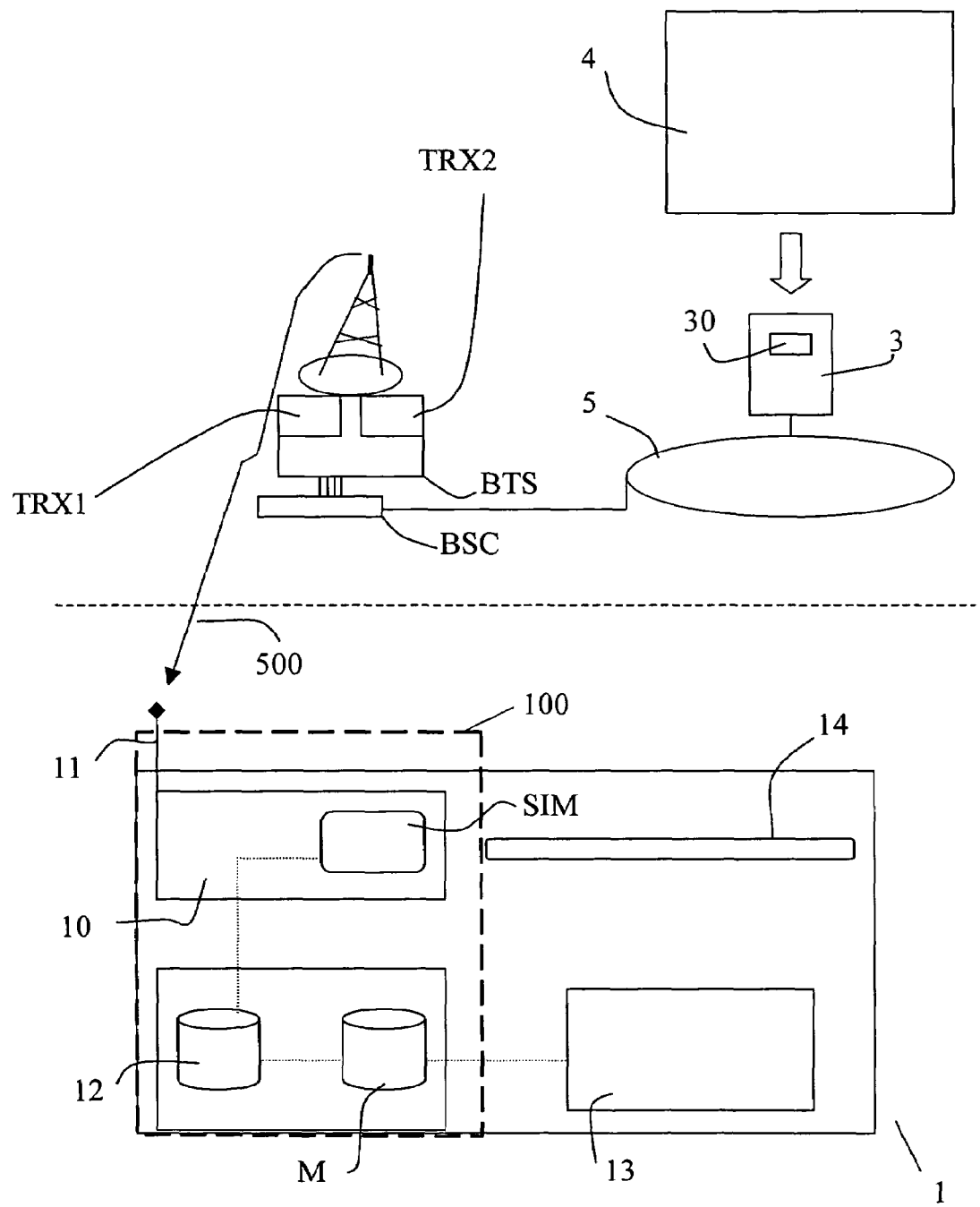
FIG. 1 represents an embodiment of the system according to the invention wherein the terminal equipment is integrated in the recorder device, FIG. 2 schematically represents the broadcasting in a radio cell of signals corresponding to data of programme items and intended for recorder devices provided with the programming terminal equipment according to the invention.
Figure 2:
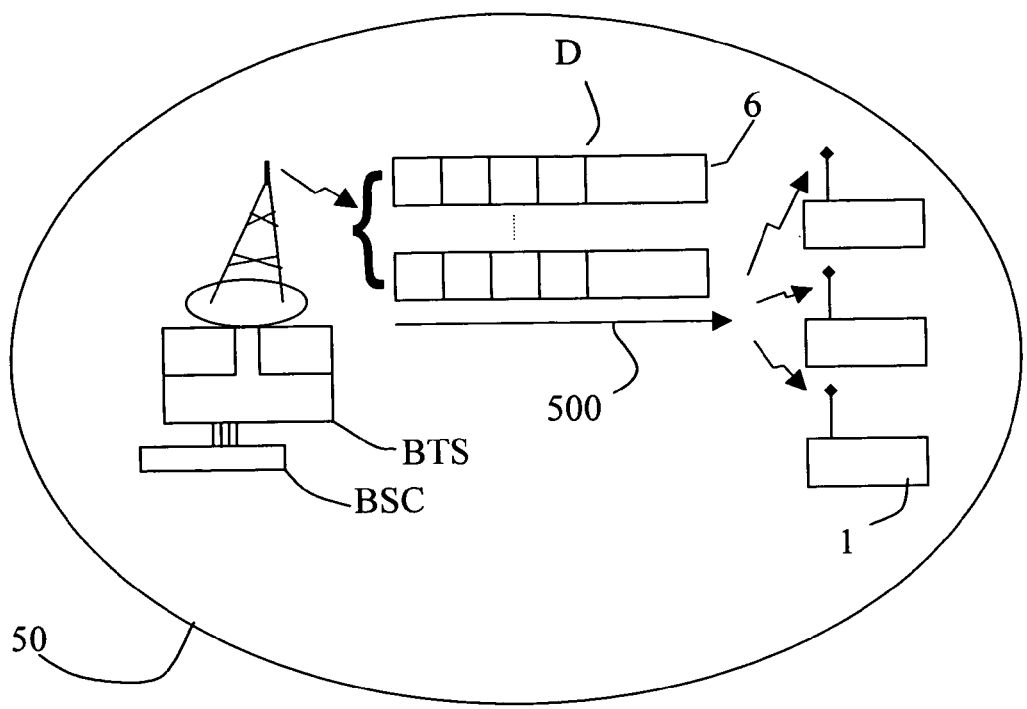

As illustrated in FIG. 1, the invention provides the use of at least one cellular radiotelephony network (5) and the integration of a programming terminal equipment unit (100) in a recorder device (1) such as a video tape recorder or a device for recording DVD (Digital Versatile Disc) media or any other device with a videogram medium (14) so as to achieve remote programming of one or more recordings of broadcasted programmes over broadcast channels of programme broadcasters, such as television channels for example, and this without prior knowledge of the programmes and broadcast channels.

In one embodiment of the invention, SMS-CB technology is engaged in the cellular radiotelephony network (5) on the whole of the BSS (Base Station Subsystem) radio subsystem of the telecommunications provider, and CBCH (Cell Broadcast Channel) channels are defined to allow the broadcasting (500) by transmitter devices (TRX1, TRX2) of the base stations (BTS) of data towards recorder devices (1) provided with a programming terminal equipment unit (100). Each base station (BTS) is then the interface between the base station controller (BSC) handling the radio resource and the terminal equipment units (100). A transmitting/receiving radio antenna (11) and means for receiving and reading (10) these data, are integrated in said terminal equipment unit (100). Data transmission is possible via the antenna (11), data transmission means may be integrated in the terminal equipment (100). It is understood that the existing infrastructure for the cellular radiotelephony network (5) may allow the implementation of SMS-CB technology intended for programming terminal equipment units (100) considered as transmitters/receivers of cellular telephones. For example the transmitting/receiving antenna is compatible with a GSM, GRPS, UMTS, etc. . . cellular radiotelephony network, or the like and the receiving and reading means (10) include means for accessing the CBCH broadcast downlink channel of said network to allow the reading of at least one text message of the SMS-CB type.

Data transmitted by the network (5) called information data (D) in the following, are representative of a programming planning schedule of programme items of a plurality of programme broadcasters and of information for identifying these programme items. In the preferred embodiment of the invention, they are transmitted in text messages of the SMS-CB type, so that several recorder devices (1) localized in a same area covered by one or more radio cells (50) of the network (5) may receive the same transmitted data in SMS-CB text messages, over the defined CBCH for this area. FIG. 2 thus represents a radio cell (50) wherein radio transmission (500) is performed over the CBCH channel to broadcast information data on the programme items which may be read by the terminal equipment units (100) of the recorder devices (1) located in the cell (50).

The initial contents (4) of the service may be provided by the production departments of the programme broadcasters, for example TV programs, to a server (3) provided with connection means to at least one cellular radiotelephony network. These initial contents (4) include programming planning schedule information of the programme items and information for identifying these programme items. For example, the initial contents (4) is coded by a reference transformation system for forming information data (D) organized into a plurality of concatenation sequences (6) which each relate to a determined programme item. The server (3) comprises storage means (30) for storing a database formed with said thereby coded information data (D). The server (3) connected to at least one cellular radiotelephony network (5) broadcasts in at least one text message, data from said database over one or several broadcast channels of the network (5). In the preferred embodiment of the invention, the radio subsystem of the network (5) is connected to the server (3) and to at least one CBCH broadcast downlink channel of said network to allow transmission (500) of the coded information data (D) from said database in one or several text messages of the SMS-CB type, in a determined area covered by one or more radio cells (50) of the network.

The receiving and reading means (10) of the programming terminal equipment (100) used in the system for programming recordings according to the invention, allow the reading of text messages transmitted over the channel broadcasting coded information data (D) from the server (3). The recorder device (1) comprises an input interface (13) connected to the programming terminal equipment (100) in order to allow the user to enter a type of programme to be recorded. The programming terminal equipment (100) may include coding means (not shown) for encoding the programme type with a determined format like the format used by the reference transformation system for coding a portion of the information relating to a programme item.

Figure 3:
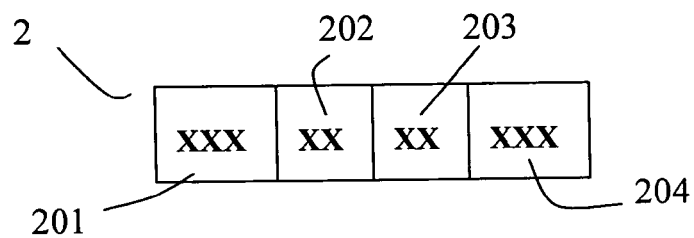
FIG. 3 represents a recording code example.

The invention will now be described with reference to FIGS. 1, 3 and 4.

According to the invention, the user may perform thematic programming of programme(s) with the input interface, the coding means encoding the desired type of programme in a recording code (2) with said determined format. This recording code (2) is stored in storage means (M) of the programming terminal equipment (100). These storage means (M) may consist of a RAM (Random Access Memory) type or of the flash type memory or of any other type of fast access memory. In the example of FIG. 3, the recording code (2) consists of a sequence concatenating the set of following data:

- a three character string in a first field for representing the category (201) of the programme item;
- a two character string in a second field for representing the kind (202) of the programme item;
- a two character string in a third field for representing the sub-kind (203) of the programme item;
- a three character string in a fourth and last field for representing the broadcast channel of a programme broadcaster (204) of the programme item.

In an alternative embodiment, the recording code (2) may do not include information relating to the broadcast channel. In another alternative embodiment, two characters are sufficient for representing the broadcast channel of a programme broadcaster (204). Of course, the number of envisaged characters of each of the fields of the sequence may be larger, for example larger than three characters. It should be understood that said determined format for the recording code (2) includes a sequence notably concatenating data representative of category, kind and possibly sub-kind of a programme item, so that it is possible for a user to establish a program with the input interface (13) while ignoring the exact broadcast time interval of the programme item. The broadcast channel may be either ignored or not by the user. In one embodiment of the invention, an unentered field for the broadcast channel may do not prevent the thematic program entered by the user from being taken into account. Data for specifying a broadcast channel of a programme broadcaster may however be included in the sequence forming the recording code (2). The programming thereby allowed by the invention may be used for recording a programme item recognized by its category, its kind or its sub-kind, for example a programme broadcast in the sports category, for which the kind is football and the sub-kind is a national championship match.

Figure 4:
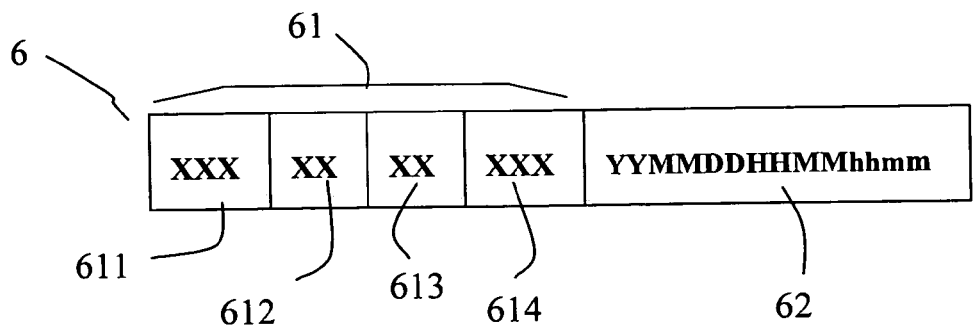
FIG. 4 represents a concatenation sequence example formed with a first identification portion and a second portion related to the broadcasting time interval.

As illustrated in the embodiment of FIG. 4, the information data (D) from the database of the server (3) may appear as concatenation sequences (6) relating to programme items, each sequence being divided into two portions (61, 62). In the not in the least limiting example of FIG. 4, the first portion (61) is coded by the reference transformation system with a format which is again found for establishing the recording code (2), so that this first portion (61) is comparable in every respect with the recording code (2). The first portion thus includes a field with at least three characters for indicating a category (611), a field with at least two characters for indicating a kind (612), a field with at least two characters for indicating a sub-kind (613), and a field with at least two or three characters for indicating a broadcast channel (614). The second complementary portion (62) comprises a string of characters for identifying the time interval of the programme item, i.e., the beginning and the end of this programme item. The second portion (62) may thus be formed with 14 characters indicating for example the date with 6 characters, (2 for the year, 2 for the month, 2 for the day), and the times for the beginnings and ends with 8 characters (4 characters for the hours and minutes of the beginning, 4 characters for the hours and the minutes of the end). Each of the programme items may be defined by a concatenation sequence (6) such as the one illustrated in FIG. 4 or by an equivalent sequence containing a representation of like information coded by the reference transformation system. In one embodiment of the invention, the storage means (M) of the terminal equipment (100) may be used for storing the whole of the SMS-CB type messages.

As illustrated in FIG. 1, the programming terminal equipment (100) has processing means (12) as for example a central processing unit, comprising a discrimination module for detecting at least one programme item to be recorded by comparing at least the first portion (61) of each of the concatenation sequences (6) with the recording code (2). Automatic parameterization means using the first discriminated portion (61) and/or its second complementary portion (62) are also provided in the processing means (12) for parameterizing in the recorder device (1), the recording of the detected programme item. These automatic parameterization means allow the beginning and the end of the recording to be programmed in the recorder device (1) as well as the broadcast channel of the programme item detected by the discrimination module.

In one embodiment of the invention, the discrimination module comprises means for comparing data representative of the broadcast channel, of a category and of at least one classification per kind of the programme item, respectively. The storage means (M) are arranged so as to store in a register, the concatenation sequence (6) comprising the coded portion (61) with said determined format, for which the data compared by the comparison means are identical with those of the recording code (2), the automatic parameterization means being connected to the storage means (M) in order to use the recording data of the sequence (6) stored in said register.

The programming terminal equipment unit (100) includes an identity module (SIM) consisting of an SIM or USIM type chip card for second or third generation networks or an equivalent card including in a memory, parameterizable data for authorizing access to a broadcast channel of the network (5). This identity module (SIM) integrated in said receiving and reading means (10) may allow the receiving or reading of data broadcasted on the CBCH channel or the like to be blocked. Access to the information data (D) provider service established by the network (5) via the CBCH channel may therefore be blocked by the sending of a message intended for the identity module (SIM), for example, in the case of cancellation of the user's subscription to this service. In one embodiment of the invention, a step for blocking access to the broadcast channel of the cellular radiotelephony network (5)

is achieved by identifying in the programming terminal equipment unit (100), the identity module (SIM) on the one hand, and by changing said access authorization data on the other hand.

The invention will now be described in relation with FIGS. 1 and 5.

Figure 5:
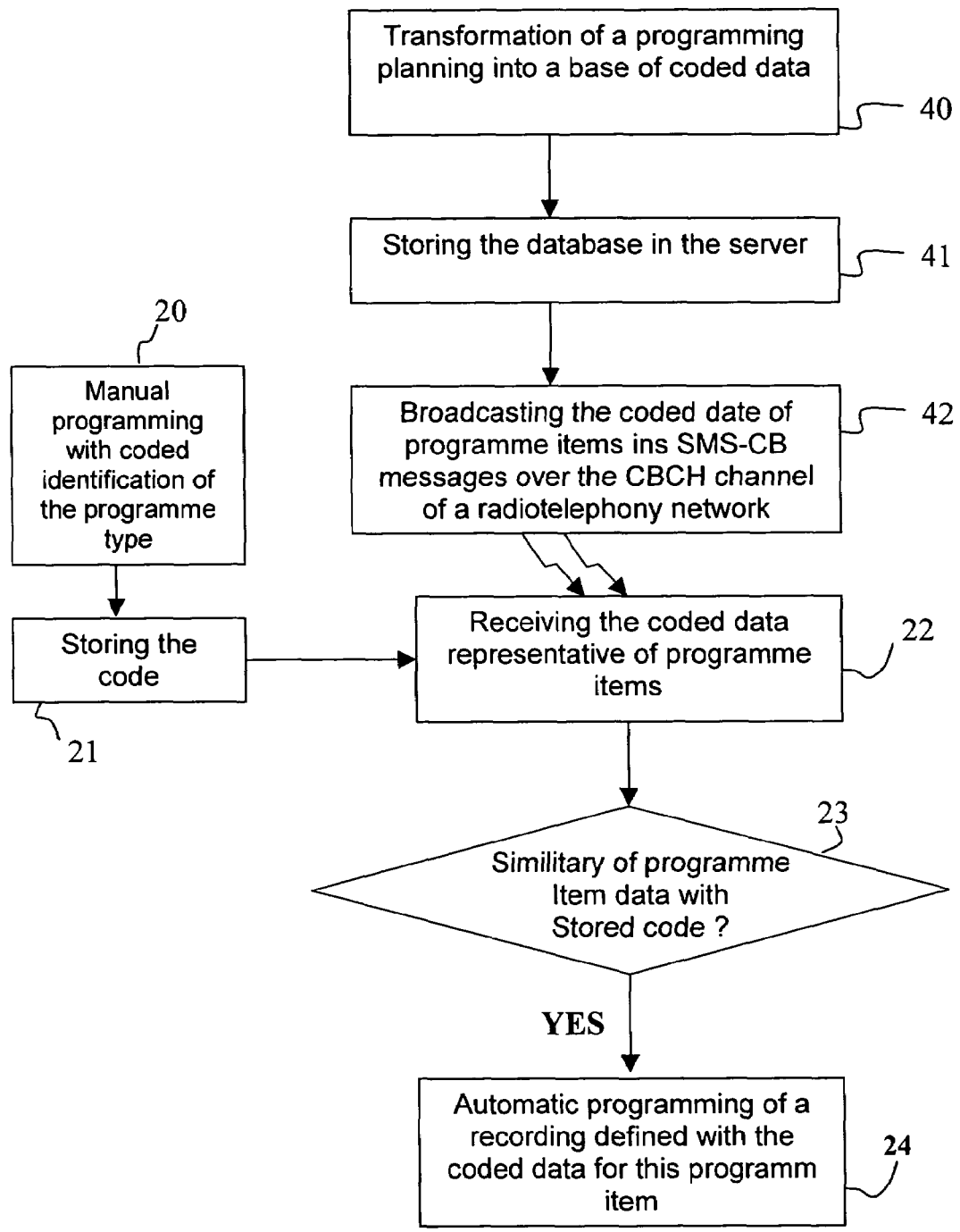
FIG. 5 represents as a diagram a process for programming a recording according to the invention.

As illustrated in FIG. 5, the method according to the invention requires a phase (40) for transforming the initial contents (4) of the service, wherein the identification and programming planning schedule information of the programme items are coded in concatenation sequences (6), and a step (41) for storing these sequences (6) in a database, in storage means (30) of the server (3).

In the preferred embodiment of the invention, the user is only involved once in this process, during a first programming step (20) comprising the inputting by the user of at least one programme type to be recorded by means of the input interface (13) of the recorder device (1), followed by the storing (21) of the recording code (2) representative of the recording instructions into the storage means (M) of the programming terminal equipment (100).

The method for programming recordings according to the invention may then proceed only after a step (22) for receiving through the receiving and reading means (10) of the terminal equipment (100), coded information data (D), transmitted over at least one broadcast channel of the network (5) in text messages. This receiving step (22) allows concatenation sequences (6) to be obtained, each of which defining one of the programme items via the first coded portion (61) with the format of the recording code (2) and the second complementary portion (62). These sequences (6) may be stored in the storage means (M) of the terminal equipment unit (100). From there on, a step (23) for detecting at least one desired programme item is performed by discriminating among the plurality of first coded portions (61), at least one first portion similar to the recording code (2). This detection step (23) thus allows identification of the sequence (6) comprising the discriminated coded portion (61) and the triggering of a second programming step (24) automatically performed by the terminal equipment unit (100). The first discriminated portion and/or its second complementary portion is then used for parameterizing in the recorder device (1) the recording of the detected programme item. If none of the received concatenation sequences (6) include a first coded portion similar to the recording code (2), the detection step (23) results in keeping the recording code while waiting for a new step (22) for receiving coded information data (D) transmitted from the server (3). Alternatively, if no programme item is detected at the end of the detecting step (23), the recording code (2) may be immediately deleted from the storage means (M) or deleted after another detection step performed after a new receipt of coded information data (D).

The detection step (23) allows the triggering of the programming of one or more detected programme items. The whole of the sequences (6) of the information data (D) may be deleted from the storage means (M) when the detection step (23) has been performed for all the concatenation sequences (6). Alternatively, the non-discriminated sequence (6) may be suppressed one by one during the detection step (23).

In one embodiment of the invention, the recording code (2) may include indications of the times for the beginning and the end of the programme item. The first programming step (20) thereby comprises the inputting of a recording time interval, the input interface (13) being arranged so as to allow the user to parameterize accurately to within a minute, a beginning and an end for a programme type. The detection step (23) then comprises the discrimination of the set formed by the first and second portions (61, 62) of the concatenation sequence (6). In an alternative embodiment, the discrimination is performed by eliminating the broadcasted programme items outside the time interval parameterized by the user.

The first programming step (20) may also comprise a prioritization of at least one characteristic relating to the type of programme to be recorded. For examples, a module for handling the recording priorities is integrated in the processing means (12). Such a handling module may thereby prevent repetitions of recordings for programme items broadcasted several times at different times. In other words, the module for handling recording priorities may prevent conflicts between redundant coded portions (61), for example by suppressing concatenation sequences (6) with data (except for time interval data), identical with a concatenation sequence already detected during the detection step (23).

The process for broadcasting information data (D) may include a step for encrypting sequences (6) transmitted over the CBCH broadcast channel, and a step for decrypting these sequences (6) by the receiving and reading means (10) of the terminal equipment (100). For example the server (3) comprises means for encrypting data so as to transmit the concatenation sequences in a non "legible" way on the cellular radiotelephony network (5). In one embodiment of the invention, the programming terminal equipment (100) comprises means for decrypting these data (D) sent by the server (3) and encrypting means for sending the codes of recordings (2) towards storage and indexation means of the server. The latter comprises decrypting means for receiving the codes (2).

One of the advantages of the invention is to provide an application between a network and a recording device, allowing the user to parameterize his device in a simple way, with a recording code, without prior knowledge of exact time indications of the broadcasted programmes, of the programme or of broadcast channels, which he wishes to record. The data included in the transmitted messages are the ones which provide the parameters required for automatic programming of the recorder device.

Another of the advantages of the invention lies in the use of Cell Broadcast technology, more efficient than conventional SMS text message broadcasting if there are several thousands of recorder devices to be targeted. Further, the broadcasting may occur in real time.

It is also important to note that in the preferred embodiment of the invention, activation of the SMS-CB receiving channel on the SIM card forming the identity module (SIM) cannot be performed manually on an existing SIM card (the existing SIM card may then be inserted into the receiver unit of the recorder). The provider cannot manage activation and deactivation rights of a CB channel on an SIM card inserted into a moving station, the client having access through the input interface of his moving station to activation or deactivation of the channels (the "opt-in" principle). The retained technique in the preferred embodiment of the invention is remote ("Over The Air") activation and deactivation on the SIM card of the SMS-CB receiving channel, according to the validity of the user's subscription.

Additionally and advantageously, according to the present invention, it is possible to trace back the programming codes of the users, on the programming interface of the recorder, towards a provider database, via an SMS-MO ("Mobile Originated"). In other words, the codes of programmed recordings (2) stored in the programming terminal equipment (100) are sent over an SMS channel of the cellular radiotelephony network (5) to a knowledge database for statistical use. For example the server (3) comprises means for storing and indexing recording codes (2) of programs thereby transmitted by the programming terminal equipment units (100). An advantage of such a provider base is to promote statistical or actual knowledge relating to the recorded programmes and broadcasts, as for example knowing the recording rate of a broadcasted programme.

As a "mediametric" measurement, this data acquisition is effectively and actually a great advantage. For example, advertisers may realize the little advantage they have in communicating on an event (very reduced advertising validity date) during late time slots, night programmes being the most recorded and when the client watches them, for example in the following week, the advertising then being often obsolete is no longer of any interest. On the contrary, for a very small mediametric audience, a high recording rate may prove to be an interesting factor for the producer of the programme who will be able to renegotiate with his broadcaster the scheduling time of the broadcast or revise the contents in order to adapt it to the public present during the broadcasting time slot of his programme.

It should be obvious to one skilled in the art that the present invention allows embodiments under many other specific forms without departing from the field of application of the invention as claimed. Accordingly, the present embodiments should be considered as an illustration, but they may be altered in the field defined by the scope of the enclosed claims and the invention should not be limited to the details given above.

What is claimed is:

1. A method for programming recordings for a recorder device containing a videogram medium and connected to a programming terminal equipment unit located in a determined area covered by one or more radio cells of at least one cellular radiotelephony network, the method being characterized in that it includes the following steps:

a first programming step performed by a user, comprising the input of at least one type of programme to be recorded by means of an input interface of the recorder device connected to the terminal equipment unit, the type of programme being encoded with a determined format in a recording code by coding means of the programming terminal equipment unit;

a step for storing the recording code in the storage means of the programming terminal equipment unit;

a step for receiving, through receiving and reading means of the terminal equipment unit, coded data representative of a programme planning schedule of programme items from a plurality of programme broadcasters and information for identifying said programme items, transmitted over at least one broadcast channel of at least one cellular radiotelephony network within said determined area, in text messages, each of the programme items being defined by at least one concatenation sequence comprising at least one first portion coded with the recording code format and a second complementary portion;

a step for detecting at least one desired programme item, consisting in discriminating among the plurality of first coded portions, at least one first portion similar to the recording code;

a second programming step automatically performed by the terminal equipment unit, using the first discriminated portion and/or its second complementary portion for parameterizing in the recorded device, the recording of the detected programme item.

2. The method for programming recordings according to claim 1, wherein the input of the type of programme by the user forms a sequence notably concatenating the following data:

data representative of a programme item category comprising a string of at least three characters, data representative of a programme item kind comprising a string of at least two characters, data representative of a programme item sub-kind comprising a string of at least two characters.

3. The method for programming recordings according to claim 2, wherein the sequence formed during the input by the user of the type of programme further comprises data representative of a broadcast channel of a programme broadcaster, formed with at least two characters.

4. The method for programming recordings according to claim 1, wherein the first coded portion of the data of a programme item comprises data representative of a programme item category, kind, sub-kind, and of a broadcast channel of a programme broadcaster, the second complementary portion comprising data representative of a date, of a time for the beginning and the end of the broadcast of the programme item.

5. The method for programming recordings according to claim 1, wherein the coded data are transmitted from a server connected to the cellular radiotelephony network and broadcasted in text messages of the SMS-CB type over a CBCH broadcast downlink channel of said network.

6. The method for programming recordings according to claim 5, characterized it includes a step for encrypting data transmitted over the CBCH broadcast channel and for decrypting these data by the receiving and reading means of the terminal equipment unit.

7. The method for programming recordings according to claim 1, wherein the detection step comprises the discrimination of the set formed by the first and second portions.

8. The method for programming recordings according to claim 1, wherein a step for blocking access to the broadcast channel of the cellular radiotelephony network is performed on the one hand by identifying in the programming terminal equipment unit an identity module (SIM) consisting of an SIM or USIM type chip card for second or third generation networks or an equivalent card including in a memory, parameterizable data for authorizing access to said broadcast channel, and on the other hand by changing said access authorization data.

9. The method for programming recordings according to claim 1, wherein the first programming step comprises the input of a recording time interval.

10. The method for programming recordings according to claim 1, wherein the first programming step comprises a prioritization of at least one characteristic relating to the type of programme to be recorded.

11. The method for programming recordings according to claim 1, wherein the codes of programmed recordings stored in the programming terminal equipment unit are sent over an SMS channel of the cellular radiotelephony network to a knowledge database for statistical use.

12. A system for programming recordings for a recorder device containing a videogram medium and connected to a programming terminal equipment unit, characterized in that it includes a server comprising storage means for storing a base of coded data representative of a programming planning schedule of programme items from a plurality of programme broadcasters and of information for identifying said programme items, the server also comprising means for connecting to at least one cellular radiotelephony network in order to broadcast in at least one text message, coded data of said database over at least one broadcast channel of the network, said terminal equipment unit comprising receiving and reading means for reading text messages transmitted over said channel broadcasting the coded data of the server, each of the programme items being defined by at least one concatenation sequence coded by a reference transformation system and forming a first portion coded with a determined format and a second complementary portion; and in that the recorder device comprises an input interface connected to the terminal equipment unit to allow the user to enter a type of programme to be recorded, the terminal equipment unit including coding means for encoding the type of programme with said determined format in a recording code and storage means for storing the recording code, the processing means of the terminal equipment unit comprising a discrimination module for detecting at least one desired programme item by comparing at least one first portion of each of the text message concatenation sequences with the recording code, and automatic parameterization means using the first discriminated portion and/or its second complementary portion for parameterizing in the recorder device, the recording of the detected programme item.

13. The system for programming recordings according to claim 12, wherein the cellular radiotelephony network comprises a radio subsystem connected to the server and to at least one CBCH broadcast downlink channel of said network for broadcasting data from said database in at least one text message of the SMS-CB type in a determined area covered by one or more radio cells of the network.

14. The system for programming recordings according to claim 12, wherein the database includes coded data of a programme item having a first coded portion containing information representative category, kind, sub-kind of programme item, broadcast channel of a programme broadcaster, and a second complementary portion containing information representative of a date, of a time for the beginning and the end of the broadcasting of the programme item.

15. The system for programming recordings according to claim 12, wherein said determined format comprises a sequence notably concatenating data representative of a category, kind and sub-kind of a programme item, as well as data representative of a broadcast channel of a programme broadcaster.

16. The system for programming recordings according to claim 12, wherein the programming terminal equipment unit includes an identity module (SIM) consisting of an SIM or USIM time chip card for second or third generation networks, or an equivalent card including in a memory, cellular parameterizable data for authorizing access to said broadcast channel of the network.

17. The system for programming recordings according to claim 12, wherein the receiving and reading means include a transmitting/receiving antenna for sending codes of recordings over an SMS channel of the network, the server comprising means for storing and indexing programme recording codes transmitted by the programming terminal equipment unites.

18. The system for programming recordings according to claim 17, wherein the server comprises encrypting/decrypting means for encrypting data to be transmitted over the network, whereas the programming terminal equipment unit comprises means for decrypting these data and encrypting means for sending recording codes to the storage and indexation means of the server.

19. A programming terminal equipment unit for programming at least one triggering of a recorder device for recording a programme broadcasted over the broadcast channel of a programme broadcaster, comprising processing means and storage means, characterized in that it includes:
  receiving and reading means capable of receiving text messages transmitted over at least one broadcast channel of a cellular radiotelephony network and reading a plurality of concatenation sequences contained in the text messages, each representative of a programme item identification and programming planning schedule of a programme broadcaster;
  means for connecting to an input interface of the recorder device allowing the user to select a type of programme to be recorded;
  coding means for encoding the type of selected programme with a determined format in a recording code, said storage means storing the recording code;
  a discrimination module in the processing means for detecting a programme item to be recorded by identifying, among the plurality of concatenation sequences read by the receiving and reading means, at least one coded portion with said determined format in a concatenation sequence and comparing this coded portion with the recording code;
  automatic parameterization means using the discriminated coded portion and/or a complementary portion in the same concatenation sequence in order to parameterize in the recorder device, the beginning and the end of the recording as well as the broadcast channel of the programme item detected by the discrimination module.

20. The equipment according to claim 19, wherein the receiving and reading means comprise a transmitting/receiving antenna compatible with a GSM, GRPS, UMTS cellular radiotelephony network, or the like, and means for accessing a CBCH broadcast downlink channel of said network to allow the reading of at least one text message of the SMS-CB type to be read on the one hand, and means for accessing SMS channels to allow recording codes to be sent to a knowledge database for statistical use, on the other hand.

21. The equipment according to claim 19, wherein the receiving and reading means include an identity module (SIM) consisting of an SIM or USIM type chip card for second or third generation networks or an equivalent card including in a memory parameterized data for authorizing access to said broadcast channel of the network.

22. The equipment according to claim 19, wherein the receiving and reading means comprise means for decrypting concatenation sequences.

23. The equipment according to claim 19, wherein the discrimination module comprises means for comparing data representative of the broadcast channel, of a category, and of at least one classification per king of programme item, respectively, the storage means being configured for storing in a register the concatenation sequence comprising a coded portion with said determined format, the data of which compared by comparison means being identical with those of the recording code, the automatic parameterization means being connected to the storage means in order to use the recording data of the sequence stored in said register.

* * * * *